(12) United States Patent
Van Dorn et al.

(10) Patent No.: US 8,771,847 B2
(45) Date of Patent: Jul. 8, 2014

(54) READER STOP-LAYERS

(75) Inventors: Carolyn Pitcher Van Dorn, Crystal, MN (US); Thomas Roy Boonstra, Chaska, MN (US); Eric Walter Singleton, Maple Plain, MN (US); Shaun Eric McKinlay, Eden Prairie, MN (US)

(73) Assignee: Seagate Technology, Cupertino, CA (US)

( * ) Notice: Subject to any disclaimer, the term of this patent is extended or adjusted under 35 U.S.C. 154(b) by 145 days.

(21) Appl. No.: 13/274,139

(22) Filed: Oct. 14, 2011

(65) Prior Publication Data

US 2013/0095349 A1    Apr. 18, 2013

(51) Int. Cl.
*G11B 5/127* (2006.01)
*H01L 43/12* (2006.01)
*G11B 5/11* (2006.01)
*G11B 5/40* (2006.01)

(52) U.S. Cl.
CPC *G11B 5/11* (2013.01); *G11B 5/112* (2013.01); *G11B 5/40* (2013.01)
USPC ............ 428/814; 360/313; 360/319; 360/320

(58) Field of Classification Search
None
See application file for complete search history.

(56) References Cited

U.S. PATENT DOCUMENTS

| | | | |
|---|---|---|---|
| 6,885,074 B2 | 4/2005 | Durlam et al. | |
| 7,070,698 B2 | 7/2006 | Le | |
| 7,105,363 B2 | 9/2006 | Durlam et al. | |
| 7,159,302 B2 | 1/2007 | Feldbaum et al. | |
| 7,246,424 B2 * | 7/2007 | Huang et al. | 29/592.1 |
| 7,296,338 B2 | 11/2007 | Le et al. | |
| 7,494,927 B2 | 2/2009 | Kostamo et al. | |
| 7,649,712 B2 | 1/2010 | Le et al. | |
| 7,652,855 B2 | 1/2010 | Freitag et al. | |
| 7,655,564 B2 | 2/2010 | Shinriki et al. | |
| 7,848,056 B2 | 12/2010 | Sakamoto et al. | |
| 8,329,320 B2 * | 12/2012 | Zhang et al. | 428/812 |
| 2006/0002022 A1 * | 1/2006 | Feldbaum et al. | 360/126 |
| 2006/0102956 A1 | 5/2006 | Kamarajugadda et al. | |
| 2006/0256482 A1 * | 11/2006 | Araki et al. | 360/319 |
| 2006/0291097 A1 * | 12/2006 | Honda et al. | 360/126 |
| 2006/0292705 A1 * | 12/2006 | Hegde et al. | 438/3 |
| 2008/0002292 A1 | 1/2008 | Le et al. | |
| 2008/0155810 A1 * | 7/2008 | Hong et al. | 29/603.18 |
| 2010/0163422 A1 * | 7/2010 | Hsiao et al. | 205/122 |
| 2010/0183957 A1 | 7/2010 | Wang et al. | |
| 2011/0007425 A1 * | 1/2011 | Vas'ko et al. | 360/313 |
| 2011/0007426 A1 | 1/2011 | Qiu et al. | |
| 2011/0042349 A1 | 2/2011 | Zhou et al. | |
| 2011/0146061 A1 * | 6/2011 | Funada et al. | 29/603.15 |

* cited by examiner

*Primary Examiner* — Kevin Bernatz
(74) *Attorney, Agent, or Firm* — HolzerIPLaw, PC

(57) ABSTRACT

Tolerances for manufacturing reader structures for transducer heads continue to grow smaller and storage density in corresponding storage media increases. Reader stop layers may be utilized during manufacturing of reader structures to protect various layers of the reader structure from recession and/or scratches while processing other non-protected layers of the reader structure. For example, the stop layer may have a very low polish rate during mechanical or chemical-mechanical polishing. Surrounding areas may be significantly polished while a structure protected by a stop layer with a very low polish rate is substantially unaffected. The stop layer may then be removed via etching, for example, after the mechanical or chemical-mechanical polishing is completed.

18 Claims, 13 Drawing Sheets

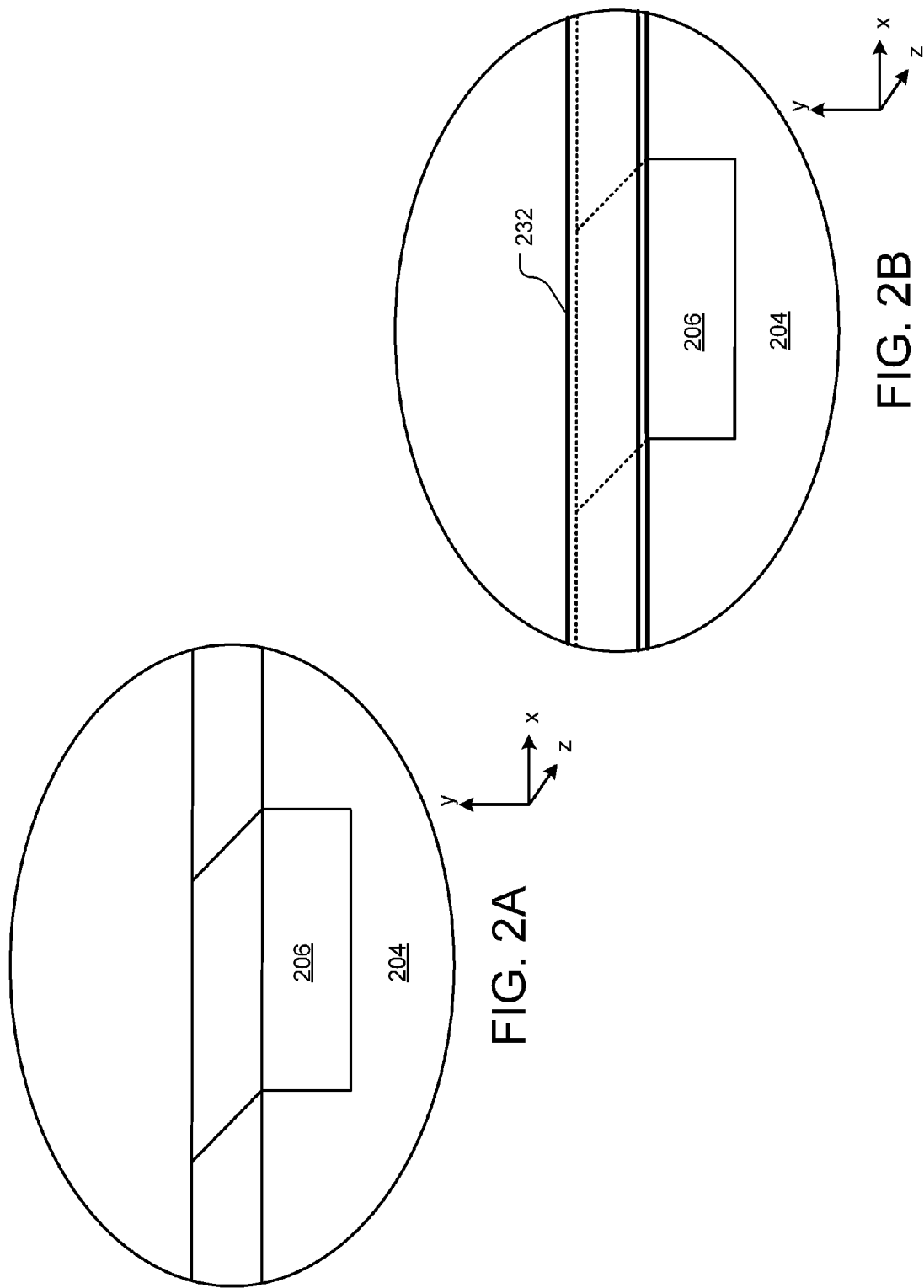

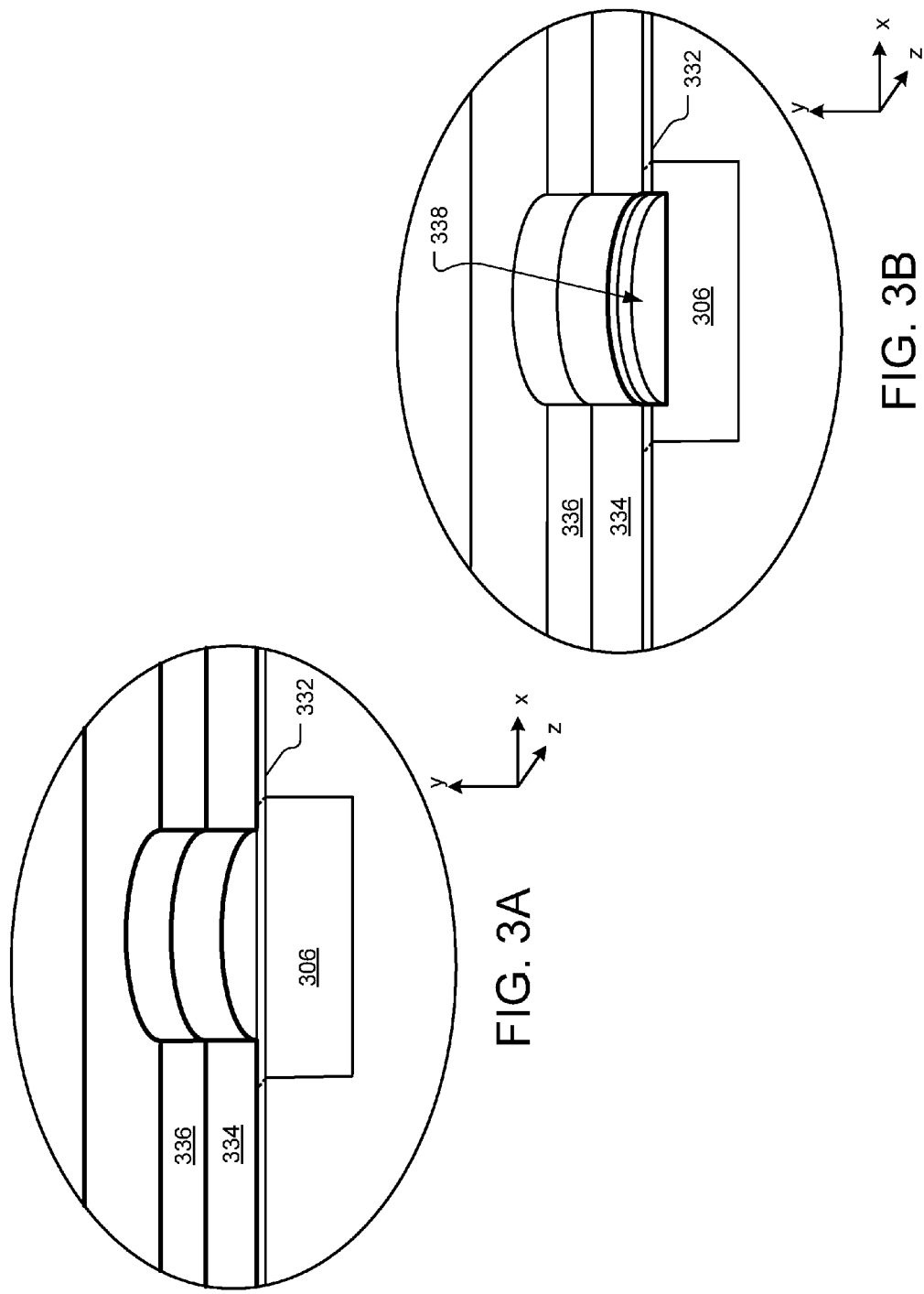

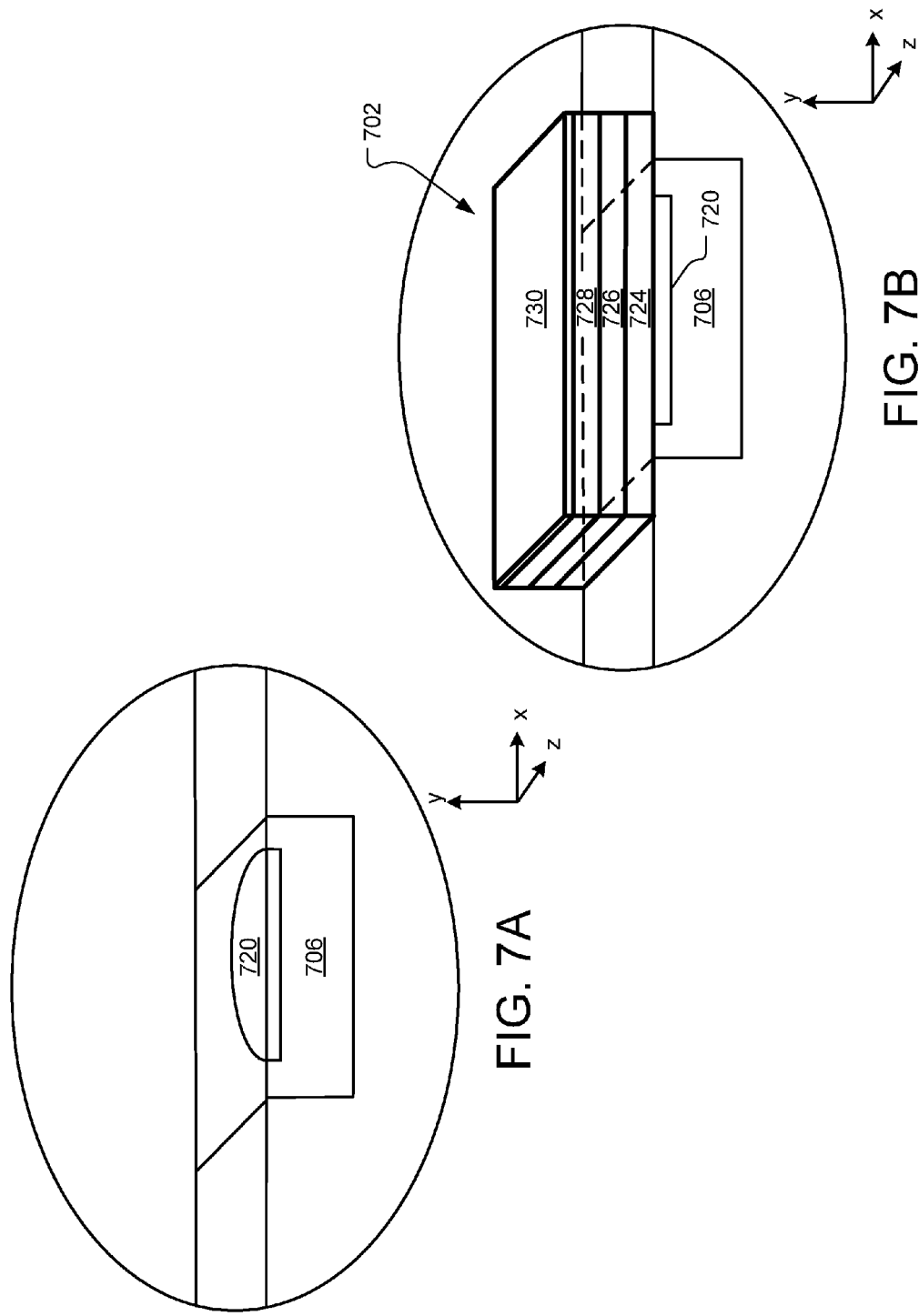

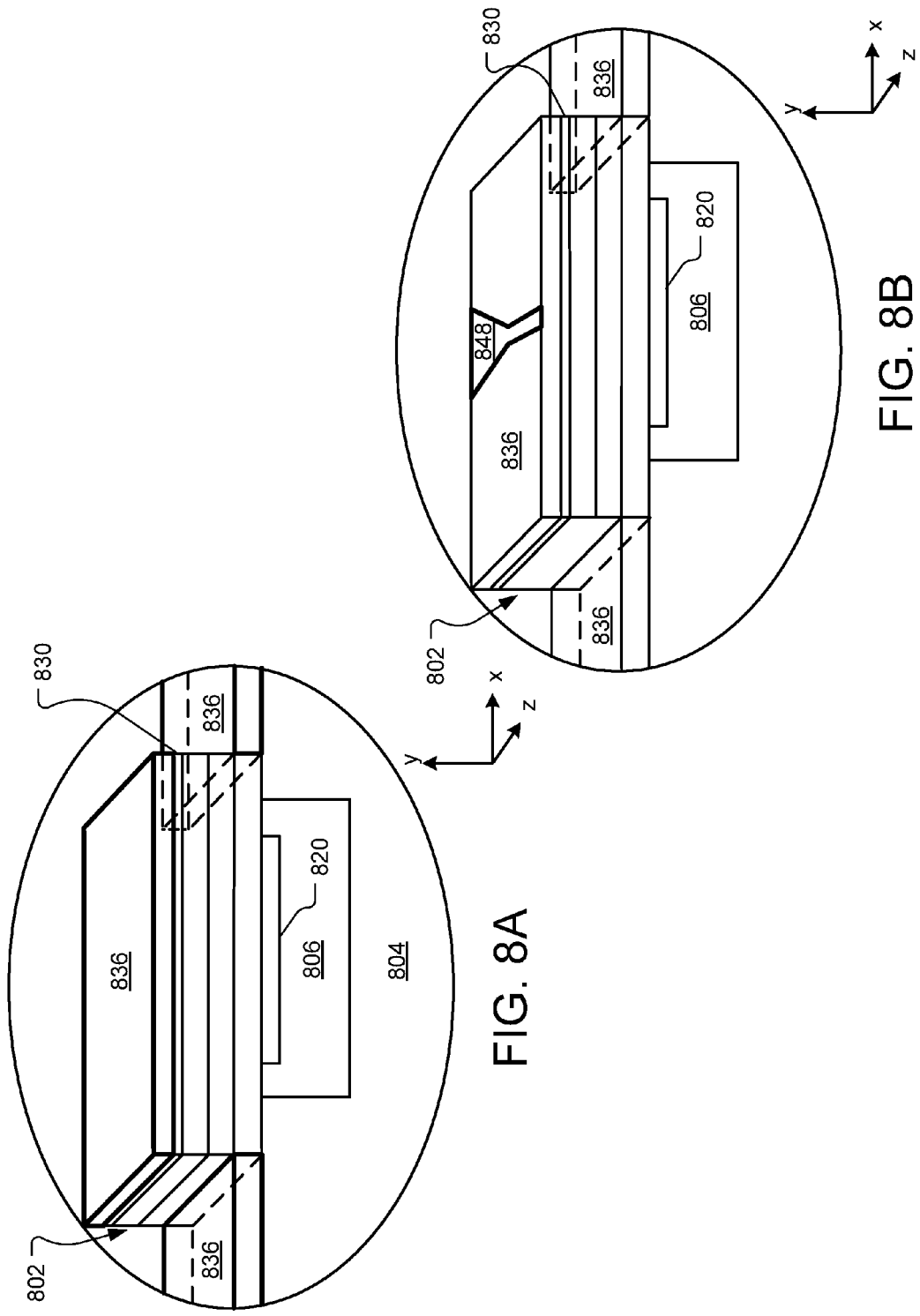

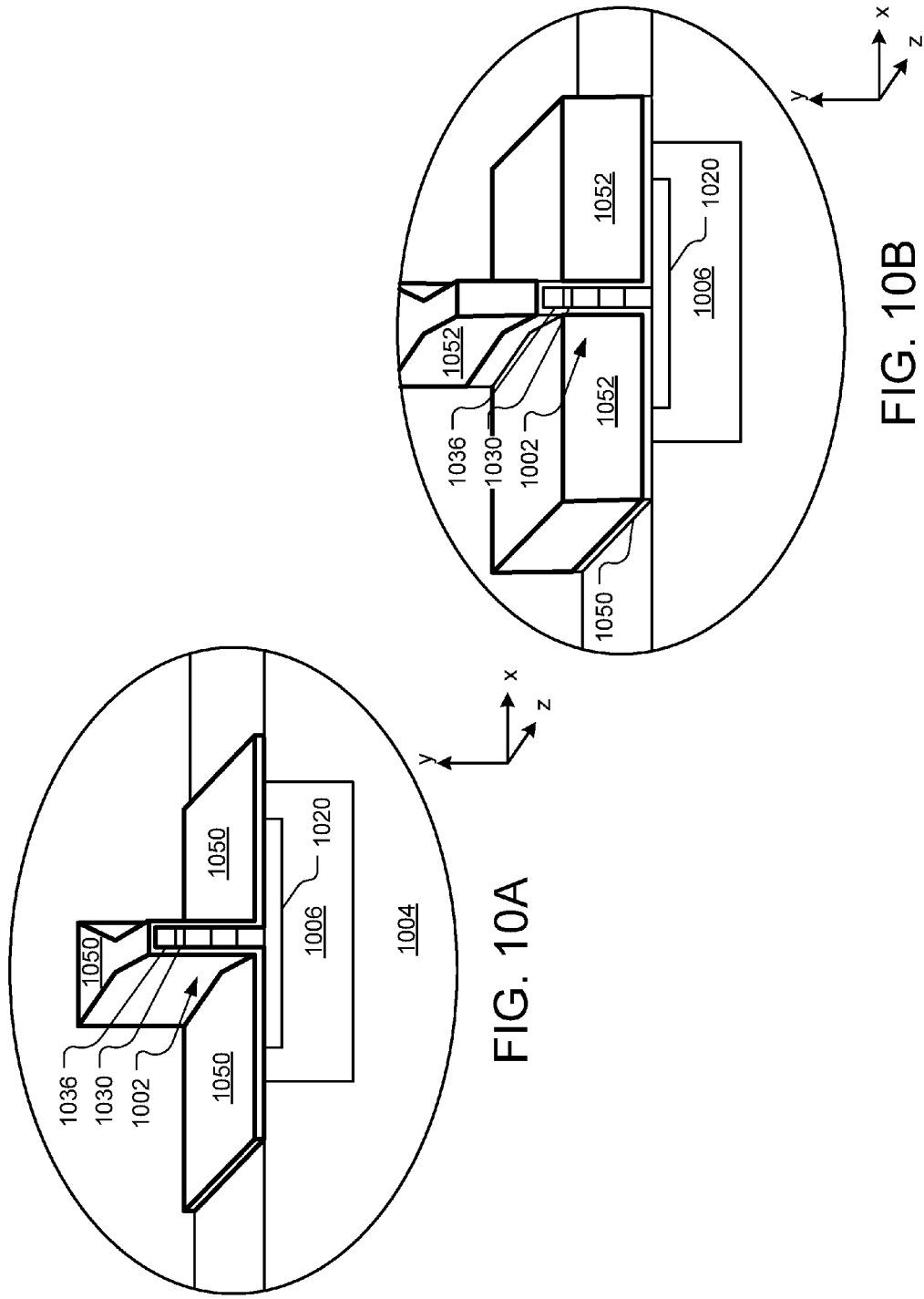

READER STOP-LAYERS

SUMMARY

Implementations described and claimed herein provide a layered magnetic structure comprising one or more stop-layers that resist mechanical polishing of the layered magnetic structure without substantial degradation and yield to chemical etching of the layered magnetic structure.

Other implementations provide a method of manufacturing a layered magnetic structure, comprising: depositing a stop-layer over a protected component of the layered magnetic structure; and mechanically polishing material adjacent the protected component without causing significant recession of the stop layer.

Still other implementations provide a read element comprising: one or more stop-layers that resist mechanical polishing of the read element without degradation and yield to chemical etching of the read element, wherein at least one of the one or more stop layers are deposited within a vacuum over one or more free layers and spacer layers of the read element.

Other implementations are also described and recited herein.

BRIEF DESCRIPTIONS OF THE DRAWINGS

FIG. 2A illustrates an example air-bearing surface of a lower shield.

FIG. 2B illustrates the example lower shield of FIG. 2A with a shield stop-layer deposited thereon.

FIG. 3A illustrates an example air-bearing surface of a lower shield with a shield stop-layer, a carbon layer, and a photo-resist layer deposited thereon.

FIG. 3B illustrates the example lower shield, shield stop-layer, carbon layer, and photo-resist layer of FIG. 3A with a depression formed in the lower shield.

FIG. 7A illustrates an example air-bearing surface of a lower shield with a shield stop-layer removed and an alumina insert in the lower shield reduced to a common plane with the lower shield.

FIG. 7B illustrates the air-bearing surface of the lower shield and the alumina insert of FIG. 7A with a tri-layer read element and a read element stop-layer deposited thereon.

FIG. 8A illustrates an example air-bearing surface of a lower shield and an alumina insert with a tri-layer reader, a reader stop-layer, and a photo-resist layer deposited thereon.

FIG. 8B illustrates the lower shield, the alumina insert, the tri-layer reader, the reader stop-layer, and the photo-resist layer of FIG. 8A, with a photo mask placed over the photo-resist layer.

FIG. 10A illustrates an example air-bearing surface of a lower shield and an alumina insert with a tri-layer reader structure, a reader stop-layer, and a photo-resist structure covered by an alumina layer.

FIG. 10B illustrates the lower shield, the alumina insert, the tri-layer reader structure, the reader stop-layer, the photo-resist layer, and the alumina layer of FIG. 10A with a metallic layer deposited thereon.

DETAILED DESCRIPTIONS

Information and communication systems increasingly handle huge amounts of data, placing heavy demands on magnetic media storage capacity and performance. A transducer head on a magnetic storage media typically includes a read element for retrieving magnetically encoded information stored on a magnetic disc. Magnetic flux from a surface of the magnetic disc causes rotation of a magnetization vector of one or more sensing layers of the read element, which in turn causes a change in electrical resistivity of the read element. The changes in electrical resistivity of the read element are correlated to the magnetically encoded information stored on the magnetic disc. Improvements in magnetic storage media technology allow areal recording densities on the magnetic discs that are available today. However, as areal recording densities increase, smaller, more sensitive read element heads are desired. As the read elements are made smaller and more sensitive, one or more stop-layers may be used during read element manufacturing to protect some layers of the read element while simultaneously processing other layers of the read element.

Figure 1:
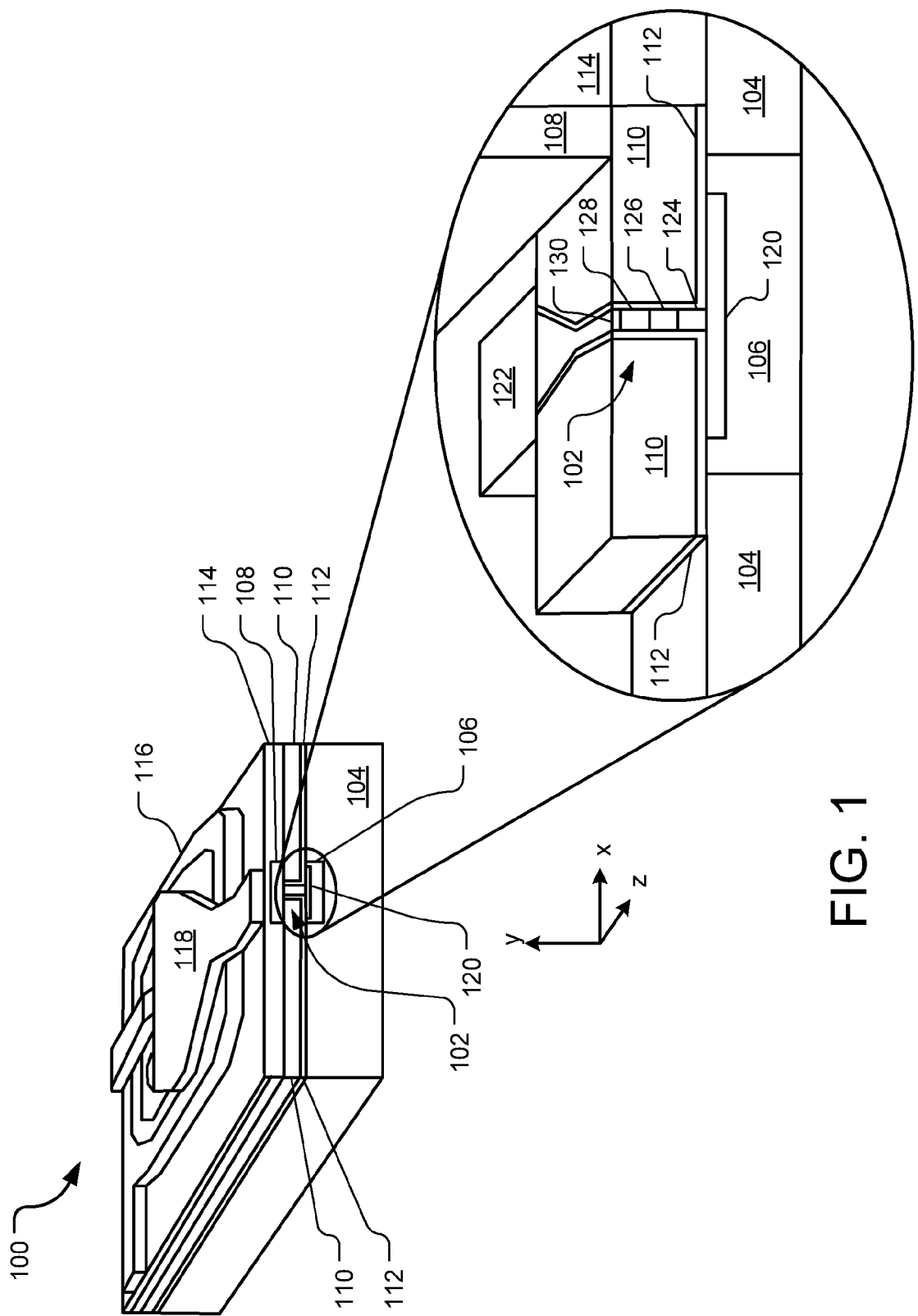
FIG. 1 illustrates an example air-bearing surface of a transducer head with a read element manufactured using one or more stop-layers.

FIG. 1 illustrates an example air-bearing surface of a transducer head 100 with a read element 102 manufactured using one or more stop-layers (not shown). The transducer head 100 is a laminated structure with a variety of layers performing a variety of functions. A nonmagnetic, non-conductive substrate 104 (e.g., $Al_2O_3$, aluminum oxide, or alumina) serves as a mounting surface for the transducer head 100 components and connects the transducer head 100 to an air-bearing slider (ABS) (not shown). A read element 102 is sandwiched between lower shield 106 and an upper shield 108. Shields 106, 108 isolate the read element 102 from electromagnetic interference, primarily y-direction interference, and serve as electrically conductive first and second electrical leads connected to processing electronics (not shown). In one implementation, shields 106, 108 are constructed of a soft magnetic material (e.g., a Ni—Fe alloy).

Further, the lower shield 106 incorporates an alumina insert 120. The alumina insert 120 is protected during manufacturing using one or more stop layers (e.g., ruthenium, chromium, and tantalum layers). The stop layers have very low and consistent polish rate under abrasive polishing (e.g., polishing with an abrasive slurry) and chemical-mechanical polishing (e.g., polishing with an abrasive and corrosive chemical slurry). In one implementation, the stop layers resist substantial recession during abrasive polishing and/or chemical-mechanical polishing (e.g., has a recession rate of less than 2 Angstroms per minute). Further, the stop layers may readily dissolve in etching processes. In other implementations, the upper shield 108 incorporates an alumina insert in addition or in lieu of the alumina insert 120. The lower shield 106 and/or read element 102 may also be protected during manufacturing using one or more stop layers.

Resistance of the read element 102 changes as magnetic regions on a magnetic media come in close proximity to the read element 102. When sense current is conducted through the read element 102 between the two shields 106, 108, changes in read element 102 resistance yields changes in readback voltage that are tracked by the processing electronics. Thus, the readback voltage corresponds to polarity of the magnetic regions on the media.

The transducer head 100 also includes nonmagnetic, non-conductive insulation layers 112 (e.g., alumina), which electrically isolate the lower shield 106 and the read element 102 from soft magnetic or non-magnetic metallic side shields 110. As a result, substantially all the current flowing between the shields 106, 108 must pass through the read element 102. The alumina insert 120 tunes the electrical resistance between the shields 106, 108 to a desired level. Further, the length of the read element 102 in the z-direction (i.e., stripe height) affects the overall resistance of the read element 102. As a result, alumina insert 120 size and shape as well as the stripe height may be optimized to provide a desired level of resistance and desired response amplitude. Further, the side shields 110 isolate the read element 102 from electromagnetic interference, primarily x-direction interference and/or z-direction interference.

The transducer head 100 also includes a barrier layer 114 between a coil 116 and the shield 108. The coil 116 in combination with a write pole 118 receives a write signal from the processing electronics and changes the magnetic polarization of magnetic regions on an adjacent magnetic media (not shown), thereby writing the data from the write signal to the magnetic media.

Portions of the soft magnetic side shield 110, the upper shield 108, and the barrier layer 114 are shown as removed in the close-up view of FIG. 1 for clarity purposes. The read element 102 is depicted as a trilayer read element. More specifically, the read element 102 includes at least three laminated metallic layers: a first ferromagnetic free layer 124, a nonmagnetic spacer layer 126, and a second ferromagnetic free layer 128. The read element 102 is capped with a stop layer 130 to prevent recession of the trilayer stack during manufacturing processes. The free layers 124, 128 each may be composed of magnetic materials such as nickel-iron-cobalt (Ni—Fe—Co) alloys. The stop layer 130 may be composed of particularly hard and non-reactive metals (e.g., ruthenium, chromium, and tantalum layers). In various implementations, the spacer layer 126 may be relatively electrically conducting or non-conducting and serves to magnetically separate the free layers 124, 128 from one another. Further, the read element 102 is depicted with an expanding width in the x-direction with depth in the negative z-direction.

Magnetic flux from a surface of the magnetic media causes rotation of a magnetization vector of each of the free layers 124, 128 of the read element 102, which in turn causes a change in electrical resistivity of the read element 102 between shields 106, 108. The changes in electrical resistivity of the read element 102 are correlated to magnetically polarized regions on the magnetic media, which in turn correspond to stored data on the magnetic media.

The polarity of each of the free layers 124, 128 is affected by nearby magnetic fields. A magnet 122 is mounted behind (in the negative z-direction) the read element 102. Other locations of the magnet 122 are contemplated herein. The magnet 122 may be fabricated from permanent magnet material such as a cobalt-platinum (Co—Pt) alloy. The magnet 122 biases the magnetization of each of the two free layers 124, 128 generally parallel to the magnetic media and converging in a "scissor-like" orientation with respect to one another. As the free layers 124, 128 pass in close proximity to polarized magnetic regions on the adjacent magnetic media, the polarization of the magnetic regions affects the polarity of each of the free layers 124, 128 and in turn affects read element 102 resistance between the shields 106, 108. More specifically, a first magnetic region polarization may increase the angle of magnetization between the two free layers 124, 128 and a second magnetic region polarization may decrease the angle of magnetization between the two free layers 124, 128. Sense current flows into the read element sensor through the shields 106, 108 (which act as electrodes) and a change in resistance affects a readback voltage. As a result, the magnetic orientation of data on the magnetic media is detected by changes in the readback voltage.

One implementation of the presently disclosed technology utilizes the following materials and thicknesses. The free layers 124, 128 may be made of various alloys containing nickel, iron, cobalt, and/or boron and have thicknesses ranging from 20-50 A, for example. The spacer layer 244 may be made of alumina, zinc oxide, calcium oxide, and/or magnesium oxide and have a thickness ranging from 0-10 A, for example. The side shields 110 may be made of NiFe alloys and have a thickness ranging from 50-200 A, for example. Each of the top and bottom shields 106, 108 may be made of NiFe alloys and have a thickness ranging from 1-2 microns, for example.

Other implementations of a read element 102 have a variety of size and shape orientations. The size and shape of read element 102 is an example only. The presently disclosed technology may also be used with read element types other than trilayer read elements as depicted herein (e.g., anistropic magnetoresistive (AMR) sensors, giant magnetoresistive (GMR) sensors including spin valve sensors and multilayer GMR sensors, and tunneling giant magnetoresistive (TGMR) sensors).

The transducer head 100 is configured to be attached to an air-bearing slider (not shown) at a distal end of an actuator arm flexure (not shown). The slider enables the transducer head 100 to fly in close proximity above a corresponding surface of the adjacent magnetic media. The air-bearing surface of the transducer head 100 is configured to face the magnetic media. The actuator arm flexure is attached to a cantilevered actuator arm (not shown) and the actuator arm flexure is adjustable to follow one or more tracks of magnetic data on a magnetic media (not shown). Electrical wires (not shown) extend along the actuator arm flexure and attach to contact pads (not shown) on the slider that ultimately connect to the transducer head 100. Read/write and other electrical signals pass to and from processing electronics (not shown) to the transducer head 100 via the electrical wires and contact pads.

FIG. 2A illustrates an example air-bearing surface of a lower shield 206. The lower shield 206 is shown as viewed from a magnetic media looking upwards at the air-bearing surface (x-y plane) of the lower shield 206. The lower shield 206 functions as a first electrical connection for conducting a sense current through a read element perpendicular to the major planes of the layers of a read element. Sides and a bottom of the lower shield 206 are surrounded by a nonmagnetic, non-conductive substrate 204 (e.g., alumina). The substrate 204 serves as a mounting surface for the read element components (e.g., the lower shield 206) and connects the read element to an air-bearing slider (ABS) (not shown). In one implementation, the lower shield 206 is polished before further processing as described below.

FIG. 2B illustrates the example lower shield 206 of FIG. 2A with a shield stop-layer 232 deposited thereon. The shield stop-layer 232 is deposited over the lower shield 206 and the surrounding substrate 204 to prevent recession of the lower shield 206 during manufacturing processes. The lower shield 206 may be referred to herein as a protected layer when referencing shield stop-layer 232. The stop layer 232 may be composed of particularly hard and non-reactive metals (e.g., ruthenium, chromium, and tantalum layers) that resist chemical-mechanical polishing (CMP) processes. In one implementation, the stop layer 232 is thin enough to be transparent (i.e., between 5 and 100 angstroms). The components of FIGS. 2A and 2B are not drawn to scale and may omit portions of a transducer head (not shown) and/or read element (not shown) for clarity of the illustrations.

FIG. 3A illustrates an example air-bearing surface of a lower shield 306 with a shield stop-layer 332, a carbon layer 334, and a photo-resist layer 336 deposited thereon. The carbon layer 334 and the photo-resist layer 336 are applied on top of the stop-layer 332 and have a semi-circular void pattern. The semi-circular void pattern is intended to aid application of an alumina insert discussed in detail below. In other implementations, the alumina insert has a profile other than semi-circular. Thus, the void pattern in the carbon layer 334 and the photo-resist layer 336 will vary depending upon the intended shape of the alumina insert.

FIG. 3B illustrates the example lower shield 306, shield stop-layer 332, carbon layer 334, and photo-resist layer 336 of FIG. 3A with a depression 338 formed in the lower shield 306. The depression 338 may be formed using ion milling. The photo-resist layer 336 protects areas of the lower shield 306 covered by the photo-resist layer 336 from the ion milling process. The depression 338 receives an alumina insert as discussed in detail below. The components of FIGS. 3A and 3B are not drawn to scale and may omit portions of a transducer head (not shown) and/or read element (not shown) for clarity of the illustrations.

Figure 4B:
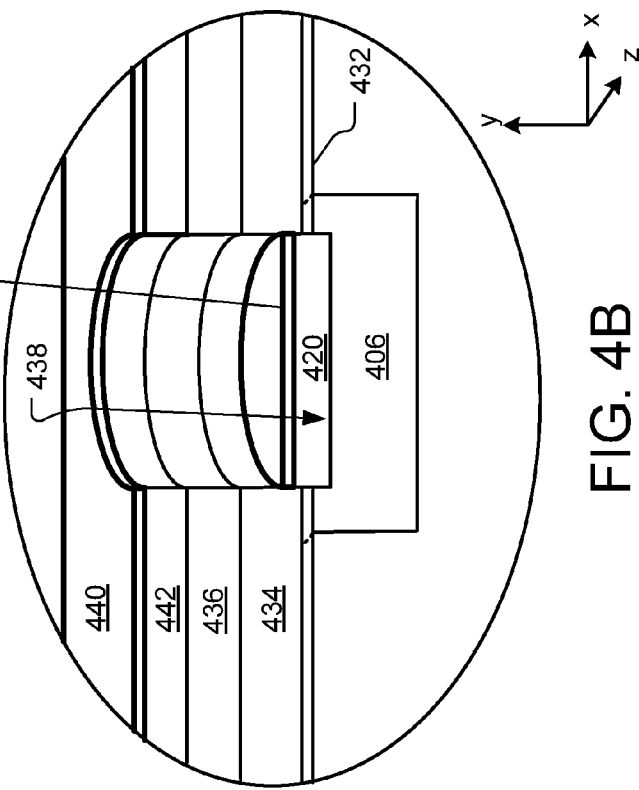
FIG. 4B illustrates the example lower shield, shield stop-layer, carbon layer, photo-resist layer, alumina layer, and alumina insert of FIG. 4A with an insert stop layer deposited thereon.
Figure 4A:
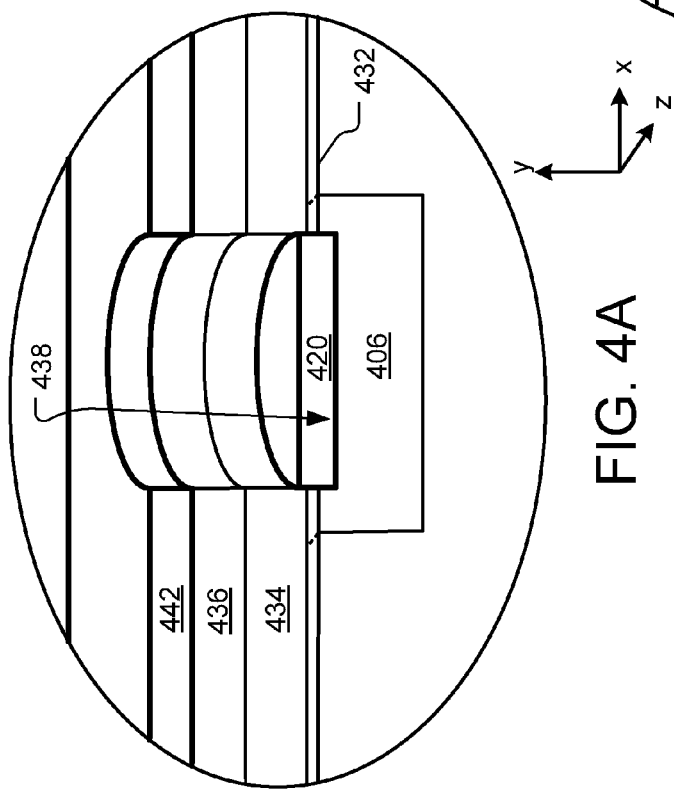
FIG. 4A illustrates an example air-bearing surface of a lower shield with a shield stop-layer, a carbon layer, a photo-resist layer, and an alumina layer deposited thereon.

FIG. 4A illustrates an example air-bearing surface of a lower shield 406 with a shield stop-layer 432, a carbon layer 434, a photo-resist layer 436, and an alumina layer 442 deposited thereon. The alumina layer 442 is deposited over the photo-resist layer 436 and within a depression 438 in the lower shield 406. The alumina layer 442 at least fills the depression 438 and may exceed the depth of the depression 438. The alumina layer 442 deposited inside the depression 438 is referred to herein as the alumina insert 420.

FIG. 4B illustrates the example lower shield 406, shield stop-layer 432, carbon layer 434, photo-resist layer 436, alumina layer 442, and alumina insert 420 of FIG. 4A with an insert stop layer 440 deposited thereon. The insert stop layer 440 is deposited over the alumina layer 442 and the alumina insert 420 and is intended to protect the alumina insert 420 from recession during polishing operations around the depression 338 as described in detail below. The alumina insert 420 may be referred to herein as a protected layer when referencing insert stop layer 440. The insert stop layer 440 may be composed of particularly hard and non-reactive metals (e.g., ruthenium, chromium, and tantalum layers) that resist chemical-mechanical polishing (CMP) processes. In one implementation, the insert stop layer 440 is thin enough to be transparent (i.e., between 5 and 100 angstroms). The components of FIGS. 4A and 4B are not drawn to scale and may omit portions of a transducer head (not shown) and/or read element (not shown) for clarity of the illustrations.

Figure 5B:
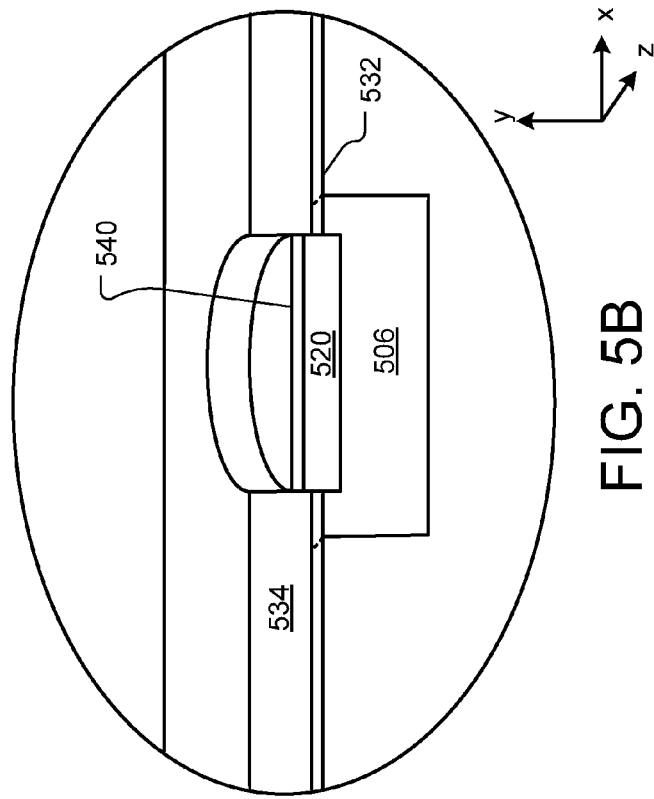
FIG. 5B illustrates the example lower shield, shield stop-layer, carbon layer, alumina insert, and insert stop-layer of FIG. 5A with the re-deposition removed.
Figure 5A:
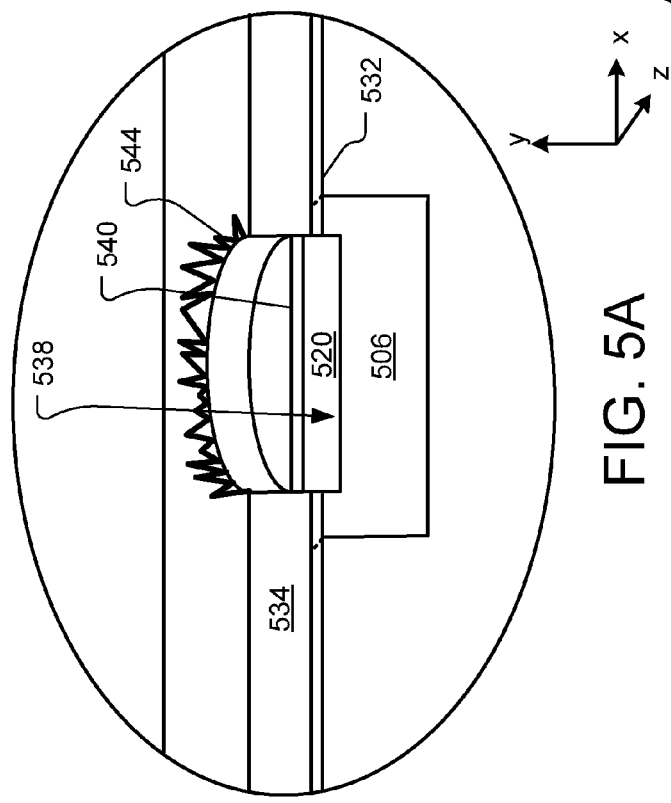
FIG. 5A illustrates an example air-bearing surface of a lower shield with a shield stop-layer and a carbon layer deposited thereon, wherein re-deposition formed from removal of one or more layers are formed about an alumina insert protruding from a depression formed in the lower shield.

FIG. 5A illustrates an example air-bearing surface of a lower shield 506 with a shield stop-layer 532 and a carbon layer 534 deposited thereon, wherein re-deposition 544 formed from removal of one or more layers (e.g., the photo-resist layer 436 and/or alumina layer 442) are formed about an alumina insert 520 protruding from a depression 538 formed in the lower shield. The photo-resist layer 436 and/or alumina layer 442 of FIG. 4 are removed, leaving re-deposition 544 of material surrounding the depression 538. In some implementations, the photo-resist layer 436 (and above alumina layer 442) is removed using a solvent, which does not affect any of the other layers. As a result, imperfections in the milling of depression 538, application of the alumina insert 520, and application of an insert stop layer 540 are revealed when the photo-resist layer 436 and/or alumina layer 442 are removed.

FIG. 5B illustrates the example lower shield 506, shield stop-layer 532, carbon layer 534, alumina insert 520, and insert stop-layer 540 of FIG. 5A with the re-deposition 544 removed. The re-deposition 544 may be removed with abrasive polishing and/or chemical-mechanical polishing of the carbon layer 534. The insert stop-layer 540 prevents the abrasive polishing and/or chemical-mechanical polishing from significantly removing material from the alumina insert 520. In one implementation, the re-deposition 544 are up to 50 nm tall (in the y-direction) and the insert stop-layer 540 is approximately 2 nm thick (in the y-direction). The 2 nm thick is sufficient to resist abrasive polishing and/or chemical-mechanical polishing of the 9 nm tall re-deposition 544. The components of FIGS. 5A and 5B are not drawn to scale and may omit portions of a transducer head (not shown) and/or read element (not shown) for clarity of the illustrations.

Figure 6A:
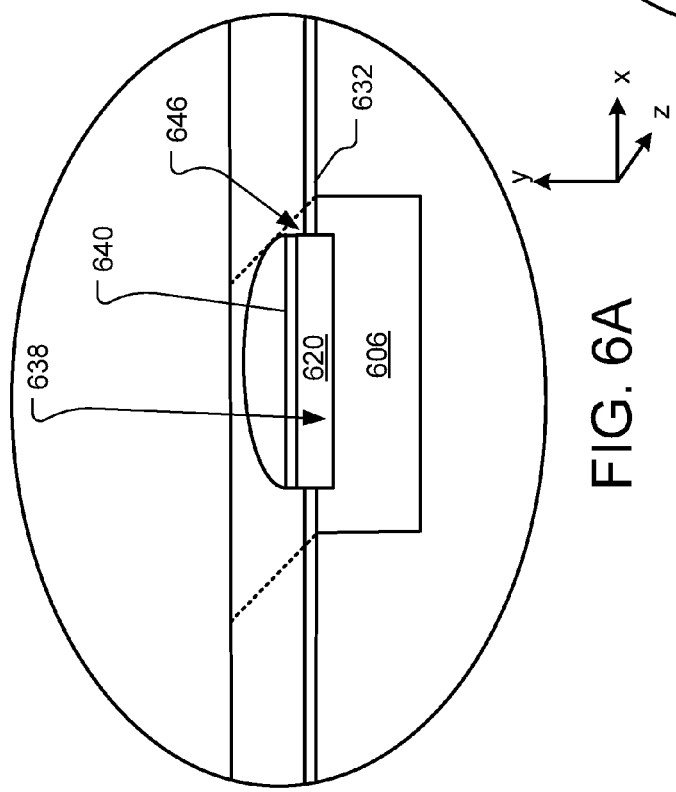
FIG. 6A illustrates an example air-bearing surface of a lower shield with a shield stop-layer deposited thereon and a stop layer capped alumina insert protruding from a depression formed in the lower shield, with a carbon layer removed.

FIG. 6A illustrates an example air-bearing surface of a lower shield 606 with a shield stop-layer 632 deposited thereon and a stop layer 640 capped alumina insert 620 protruding from a depression 638 formed in the lower shield 606, with a carbon layer removed. The carbon layer 534 of FIGS. 5A and 5B is removed in FIG. 6A. The carbon layer 534 may be removed with a plasma etching process, an acid etching process, or a chemical-mechanical polishing process, for example. The shield stop-layer 632 protects the lower shield 606 from recession during removal of the carbon layer. The insert stop layer 640 protects the alumina insert 620 from recession during removal of the carbon layer. After the carbon layer is removed, an offset between the insert stop layer 640 and the shield stop-layer 632 in the y-direction is revealed. A gap 646 that is not covered by stop layer material exists at the interface between the lower shield 606 and the alumina insert 620.

Figure 6B:
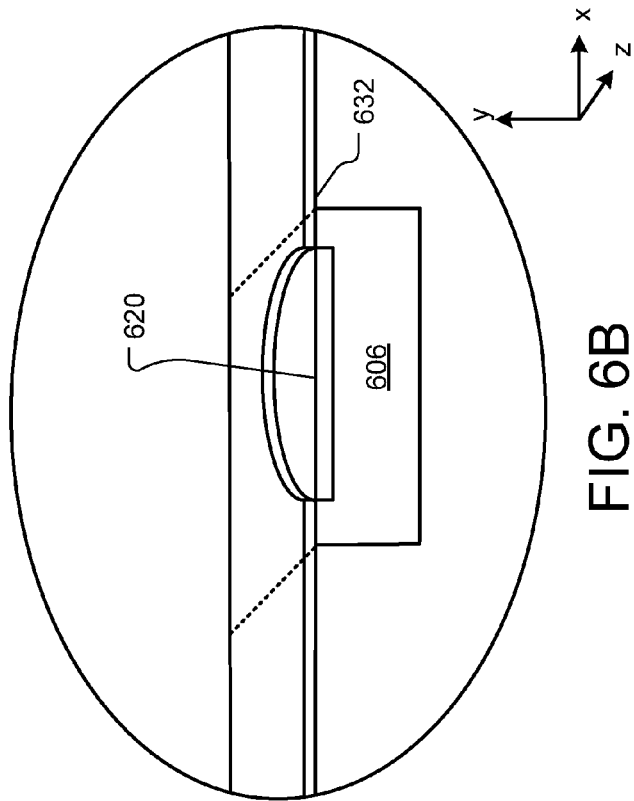
FIG. 6B illustrates the air-bearing surface of the lower shield and the alumina insert of FIG. 6A, wherein some or all of the alumina insert that had been protruding above the air-bearing surface of the lower shield is removed.

FIG. 6B illustrates the air-bearing surface of the lower shield 606 and the alumina insert 620 of FIG. 6A, wherein some or all of the alumina insert 620 that had been protruding above the air-bearing surface of the lower shield 606 is removed. While the x-z planar top surface of the alumina insert 620 is protected from abrasive polishing and/or chemical-mechanical polishing by insert stop layer 640, the protruding portion of the alumina insert 620 may be removed by a side-milling process (i.e., milling in the x-z plane). The side milling utilizes a gap between the insert stop layer 640 and a shield stop-layer 632 that is not covered by a stop layer material (see e.g., gap 646 of FIG. 6A) to mill alumina underneath the shield stop-layer 632 and thus remove the portion of the alumina insert 620 protruding above the air-bearing surface of the lower shield 606.

As a result, the insert stop layer 640 is removed with the portion of the alumina insert 620 protruding above the air-bearing surface of the lower shield 606. The alumina insert 620 may also be polished at this point. The shield stop-layer 632 may protect the polished lower shield 606 from scratches caused by polishing the alumina insert 620. In one implementation, a 3 nm thick (in the y-direction) shield stop-layer 632 is sufficient to prevent polishing of the alumina insert 620 from scratching the lower shield 606. The components of FIGS. 6A and 6B are not drawn to scale and may omit portions of a transducer head (not shown) and/or read element (not shown) for clarity of the illustrations.

FIG. 7A illustrates an example air-bearing surface of a lower shield 706 with a shield stop-layer (see shield stop-layer of FIG. 632) removed and an alumina insert 720 in the lower shield 706 reduced to a common plane with the lower shield 706. The shield stop-layer may be removed using an etchant, leaving the alumina insert 720 coplanar in the x-z plane with the lower shield 706. In other implementations, the shield stop-layer may remain and assist deposition of a read element (see below).

FIG. 7B illustrates the air-bearing surface of the lower shield 706 and the alumina insert 720 of FIG. 7A with a tri-layer read element 702 and a read element stop-layer 730 deposited thereon. The tri-layer read element 702 includes at least three laminated metallic layers: a first ferromagnetic free layer 724, a nonmagnetic spacer layer 726, and a second ferromagnetic free layer 728. The read element 702 is capped with a stop layer 730 to prevent recession of the tri-layer read element 702 during manufacturing processes. One or more layers of the read element 702 may be referred to herein as a protected layer when referencing read element stop-layer 730. Portions of the first ferromagnetic free layer 724, the nonmagnetic spacer layer 726, the second ferromagnetic free layer 728, and the stop layer 730 are shown as removed in the close-up view of FIG. 7B for clarity purposes. For example, the first ferromagnetic free layer 724, the nonmagnetic spacer layer 726, the second ferromagnetic free layer 728, and the stop layer 730 may cover 90% of a corresponding wafer before additional processing is completed on the tri-layer read element 702.

The read element stop-layer 730 may be composed of particularly hard and non-reactive metals (e.g., ruthenium, chromium, and tantalum layers) that resist chemical-mechanical polishing (CMP) processes. In one implementation, the insert stop layer 440 is thin enough to be transparent (i.e., approximately 5 to 100 angstroms).

In one implementation, each layer of the tri-layer read element 702 and the read element stop-layer 730 are deposited together without breaking a vacuum during the deposition process. This ensures that the read element stop-layer 730 adheres to the top layer of the tri-layer read element 702 without an oxidation layer there between. The components of FIGS. 7A and 7B are not drawn to scale and may omit portions of a transducer head (not shown) and/or read element (not shown) for clarity of the illustrations.

FIG. 8A illustrates an example air-bearing surface of a lower shield 806 and an alumina insert 820 with a tri-layer reader 802, a reader stop-layer 830, and a photo-resist layer 836 deposited thereon. The photo-resist layer 836 covers at least the tri-layer reader 802 and the reader stop-layer 830. The photo-resist layer 836 may also cover surrounding substrate 804 material.

FIG. 8B illustrates the lower shield 806, the alumina insert 820, the tri-layer reader 802, the reader stop-layer 830, and the photo-resist layer 836 of FIG. 8A, with a photo mask 848 placed over the photo-resist layer 836. The photo mask 848 is applied on top of the photo-resist layer 836 and has a shape resembling a triangle with a rectangular extension from one of the points of the triangle. The photo-resist layer 836 shape is intended to pattern the final shape of the tri-layer reader 802 as discussed in detail below. In other implementations, the tri-layer reader 802 has a profile other than shown in FIG. 1B, for example. Thus, the photo-resist layer 836 shape will vary depending upon the intended shape of the tri-layer reader 802.

The photo mask 848 selectively shields the photo-resist layer 836 from exposure to light during photolithography. The light develops areas of the photo-resist layer 836 that are exposed. In one implementation, the photo mask 848 includes glass and chrome portions. The glass portions allow light to penetrate to the photo-resist layer 836. The chrome portions reflect away light and shields the photo-resist layer 836 from the light. In a glass and chrome photo mask 848, the shape resembling a triangle with a rectangular extension from one of the points of the triangle corresponds to the chrome or photo-transparent portion of the photo mask 848, depending on whether the photo-resist layer 836 is a positive photo-resist or a negative photo-resist. More specifically, a positive photo-resist becomes soluble when exposed to light and a negative photo-resist becomes insoluble when exposed. A developer removes the insoluble material. The components of FIGS. 8A and 8B are not drawn to scale and may omit portions of a transducer head (not shown) and/or read element (not shown) for clarity of the illustrations.

Figure 9A:
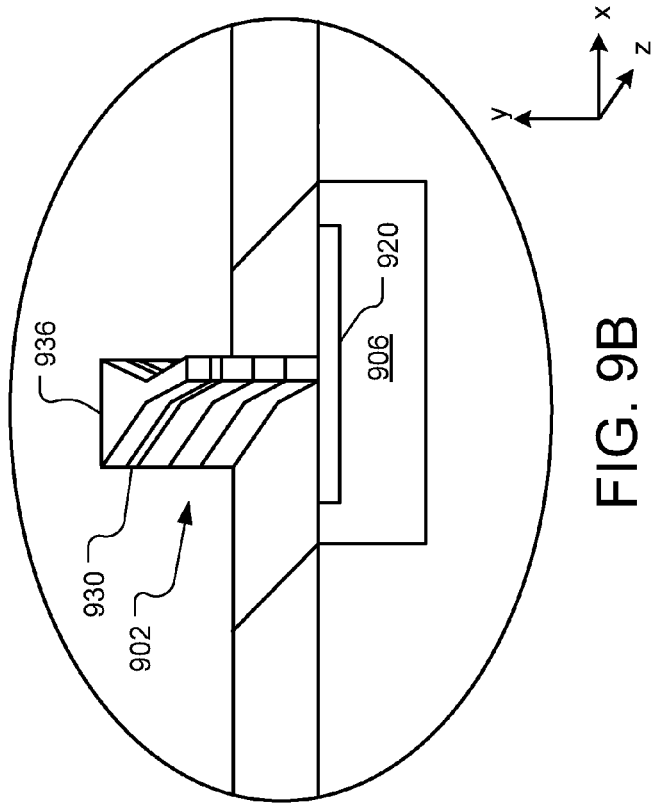
FIG. 9A illustrates an example air-bearing surface of a lower shield and an alumina insert with a tri-layer reader, a reader stop-layer, and a photo-resist structure defined by a photo mask.

FIG. 9A illustrates an example air-bearing surface of a lower shield 906 and an alumina insert 920 with a tri-layer reader 902, a reader stop-layer 930, and a photo-resist structure 936 defined by a photo mask (see photo mask 848 of FIG. 8B). Areas of the photo-resist structure 936 not protected from exposure to light by a photo mask are developed by photolithography. In one implementation, photolithography does not develop any of the reader stop-layer 930. The reader stop-layer 930 may protect top layers of the tri-layer reader 902 from the photolithography. A photo-resist structure 936 with a shape resembling a triangle with a rectangular extension from one of the points of the triangle remains after photolithography.

Figure 9B:
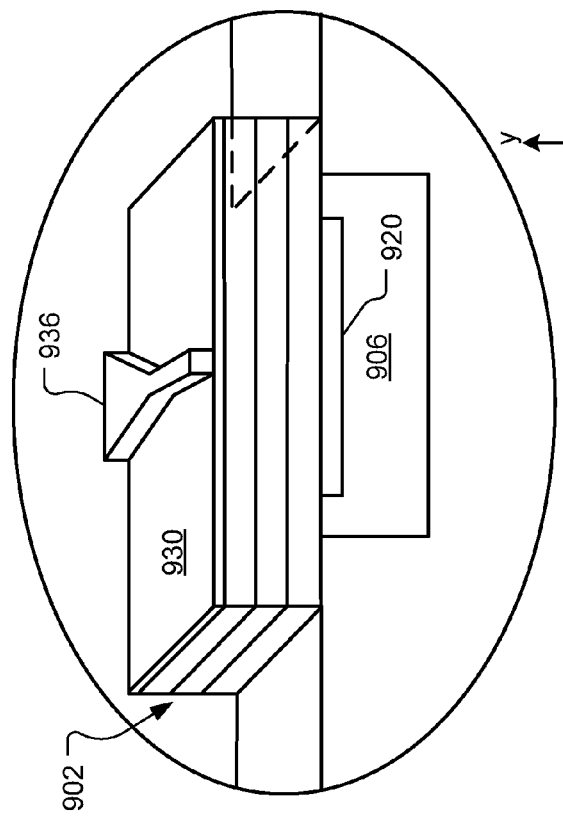
FIG. 9B illustrates the lower shield and the alumina insert of FIG. 9A with areas of the tri-layer reader and the reader stop-layer not protected by the photo-resist structure removed.

FIG. 9B illustrates the lower shield 906 and the alumina insert 920 of FIG. 9A with areas of the tri-layer reader 902 and the reader stop-layer 930 not protected by the photo-resist structure 936 removed. In one implementation, an ion-milling process removes areas of the reader stop-layer 930 and tri-layer reader 902 not covered by the photo-resist structure 936. As a result, the tri-layer reader 902 and the reader stop-layer 930 have a shape resembling a triangle with a rectangular extension from one of the points of the triangle remains after ion-milling. The shape corresponds to the photo mask 848 shape of FIG. 8B. The components of FIGS. 9A and 9B are not drawn to scale and may omit portions of a transducer head (not shown) and/or read element (not shown) for clarity of the illustrations. In some implementations, an additional reader stop-layer may be applied to the sides of the tri-layer reader 902 to further protect the tri-layer reader 902 from recession.

FIG. 10A illustrates an example air-bearing surface of a lower shield 1006 and an alumina insert 1020 with a tri-layer reader structure 1002, a reader stop-layer 1030, and a photo-resist structure 1036 covered by an alumina layer 1050. The alumina layer 1050 may also overlap onto surrounding substrate 1004. The alumina layer 1050 forms the insulation layers 112 depicted in FIG. 1. The alumina layer 1050 electrically isolates the lower shield 1006 and the tri-layer reader structure 1002 from soft magnetic side shields (see non-magnetic metallic layer 1052 of FIG. 10B). In one implementation, the alumina layer 1050 is thin enough to be transparent (e.g., between 10 and 90 angstroms).

FIG. 10B illustrates the lower shield 1006, the alumina insert 1020, the tri-layer reader structure 1002, the reader stop-layer 1030, the photo-resist layer 1036, and the alumina layer 1036 of FIG. 10A with a metallic layer 1052 deposited thereon. The non-magnetic or soft magnetic metallic layer 1052 fills in areas adjacent the tri-layer reader structure 1002 that were previously milled away. The metallic layer 1052 forms the side shields 110 depicted in FIG. 1. The metallic layer 1052 isolates the tri-layer reader structure 1002 from electromagnetic interference.

Figure 11:
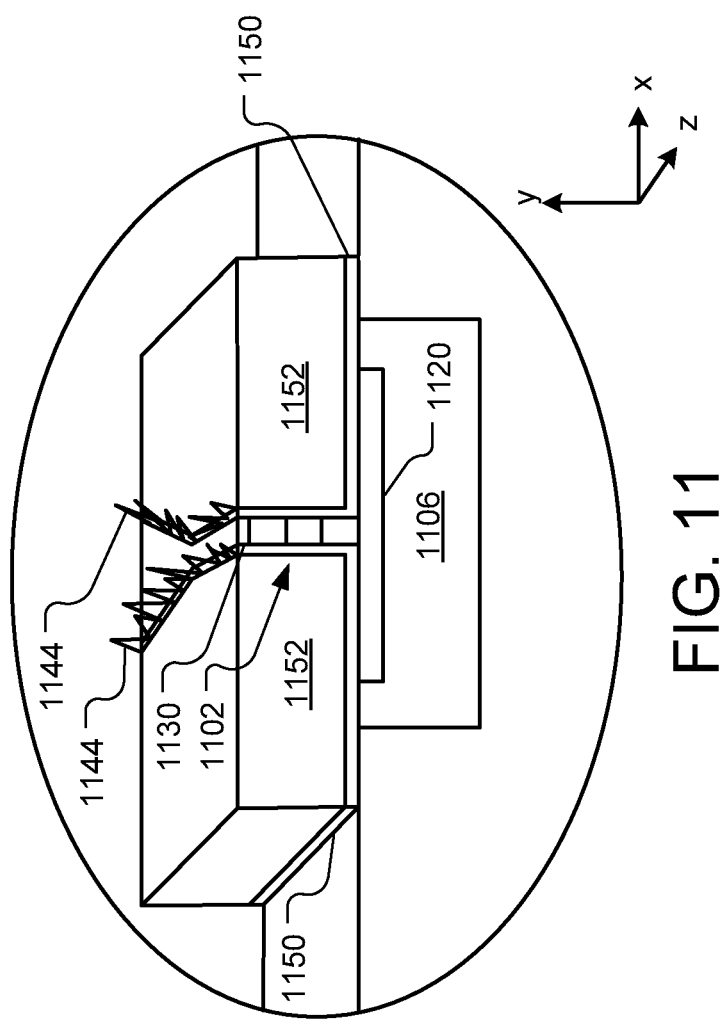
FIG. 11 illustrates an example air-bearing surface of a lower shield and an alumina insert with a tri-layer reader structure, a reader stop-layer, an alumina layer, and a metallic layer, with portions of the metallic layer, the alumina layer, and a photo-resist layer above the tri-layer reader structure removed and re-deposition remaining.

FIG. 11 illustrates an example air-bearing surface of a lower shield 1106 and an alumina insert 1120 with a tri-layer reader structure 1102, a reader stop-layer 1130, an alumina layer 1150, and a metallic layer 1152, with portions of the metallic layer 1152, the alumina layer 1150, and a photo-resist layer (not shown) above the tri-layer reader structure removed and re-deposition 1144 remaining. A side milling operation (milling in the x-y plane) removes an exposed portion of the alumina layer 1150 adjacent the photo-resist layer (see exposed portion of the photo-resist layer 1036 of FIG. 10B). The photo-resist layer then is then removed and the alumina layer 1150 and non-magnetic or soft magnetic metallic layer 1152 above (in the y-direction) the reader stop-layer 1130 are lifted away. Re-deposition 1144 of material may remain. In some implementations, the photo-resist layer is removed using a solvent, which does not affect any of the other layers. As a result, imperfections in the milling of alumina layer 1150, for example are revealed when the photo-resist layer is removed.

The re-deposition 1144 may be removed with abrasive polishing and/or chemical-mechanical polishing of the exposed portions of the metallic layer 1152, alumina layer 1150, and reader stop-layer 1130. The reader stop-layer 1130 prevents the abrasive polishing and/or chemical-mechanical polishing from significantly removing material from the tri-layer reader structure 1102. In one implementation, a 40-second chemical-mechanical polishing operation is sufficient to remove the re-deposition and not significantly recess the tri-layer reader structure 1102. For example, an approximately 8 nm thick reader stop-layer 1130 can resist the 40-second chemical-mechanical polishing operation. Optionally, the reader stop-layer 1130 may be chemically etched away after the abrasive polishing and/or chemical-mechanical polishing. The components of FIGS. 11A and 11B are not drawn to scale and may omit portions of a transducer head (not shown) and/or read element (not shown) for clarity of the illustrations.

Figure 12:
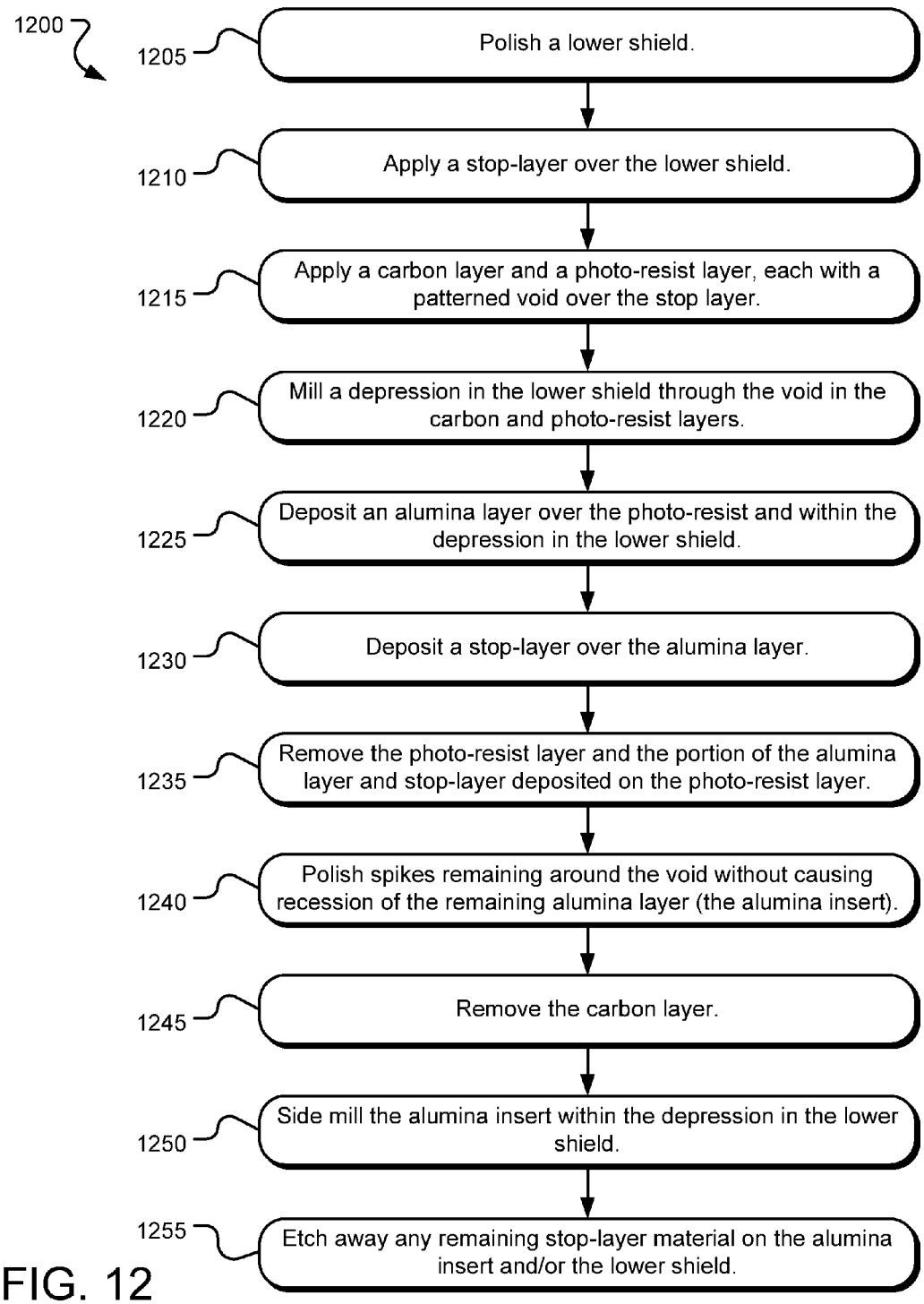
FIG. 12 illustrates example operations for preparing a lower shield with an integrated alumina insert for manufacturing a read element using one or more stop-layers.

FIG. 12 illustrates example operations 1200 for preparing a lower shield with an integrated alumina insert for manufacturing a read element using one or more stop-layers. A polishing operation 1205 polishes a lower shield for the read element. An applying operation 1210 applies a stop-layer over the lower shield. The stop-layer protects the lower shield from scratches during further manufacturing processes as discussed below. As such, the lower shield may be referred to as a protected layer. The stop-layer may comprise Ruthenium or other hard non-magnetic materials.

A second applying operation 1215 applies a carbon layer and a photo-resist layer over the lower shield. Each of the carbon layer and a photo-resist layer have a patterned void that patterns an alumina insert in the lower shield as discussed in detail below. A milling operation 1220 mills a depression in the lower shield through the void in the carbon layer and the photo-resist layer. The depression is intended to receive the alumina insert as discussed below. A depositing operation 1225 deposits an alumina layer over the photo-resist layer and within the depression in the lower shield. The alumina layer at least fills the depression in the lower shield and may exceed the depth of the depression in the lower shield, thus forming an alumina insert.

A second depositing operation 1230 deposits a stop-layer over the alumina layer. The stop-layer protects the alumina insert from recession during further manufacturing processes as discussed below. As such, the alumina insert may be referred to as a protected layer. The stop-layer may comprise Ruthenium or other hard non-magnetic materials. A removing operation 1235 removes the photo-resist layer and the portion of the alumina layer and stop-layer deposited on the photo-resist layer. Removing operation 1235 leaves re-deposition spikes of material around the void in the carbon layer and alumina insert.

A second polishing operation 1240 polishes the re-deposition spikes around the void in the carbon layer and the alumina insert. The stop-layer over the alumina insert prevents the second polishing operation 1240 from causing recession of the alumina insert. A removing operation 1245 removes the carbon layer leaving the stop-layer capped alumina insert slightly protruding above the stop layer capped lower shield.

A side milling operation 1250 side mills the alumina insert within the depression in the lower shield. The side milling operation 1250 operates through a gap in the stop-layer over the alumina insert and the stop layer over the lower shield. The side mill removes the portion of the alumina insert protruding beyond the lower shield. The top-layer over the alumina insert is also removed by removing the alumina insert protruding beyond the lower shield. The alumina insert may also be polished at this point. An etching operation 1255 etches away any remaining stop-layer material on the alumina insert and/or the lower shield. In some implementations, the etching operation 1255 is not performed and the stop-layer material on the alumina insert and/or the lower shield is left remaining.

Figure 13:
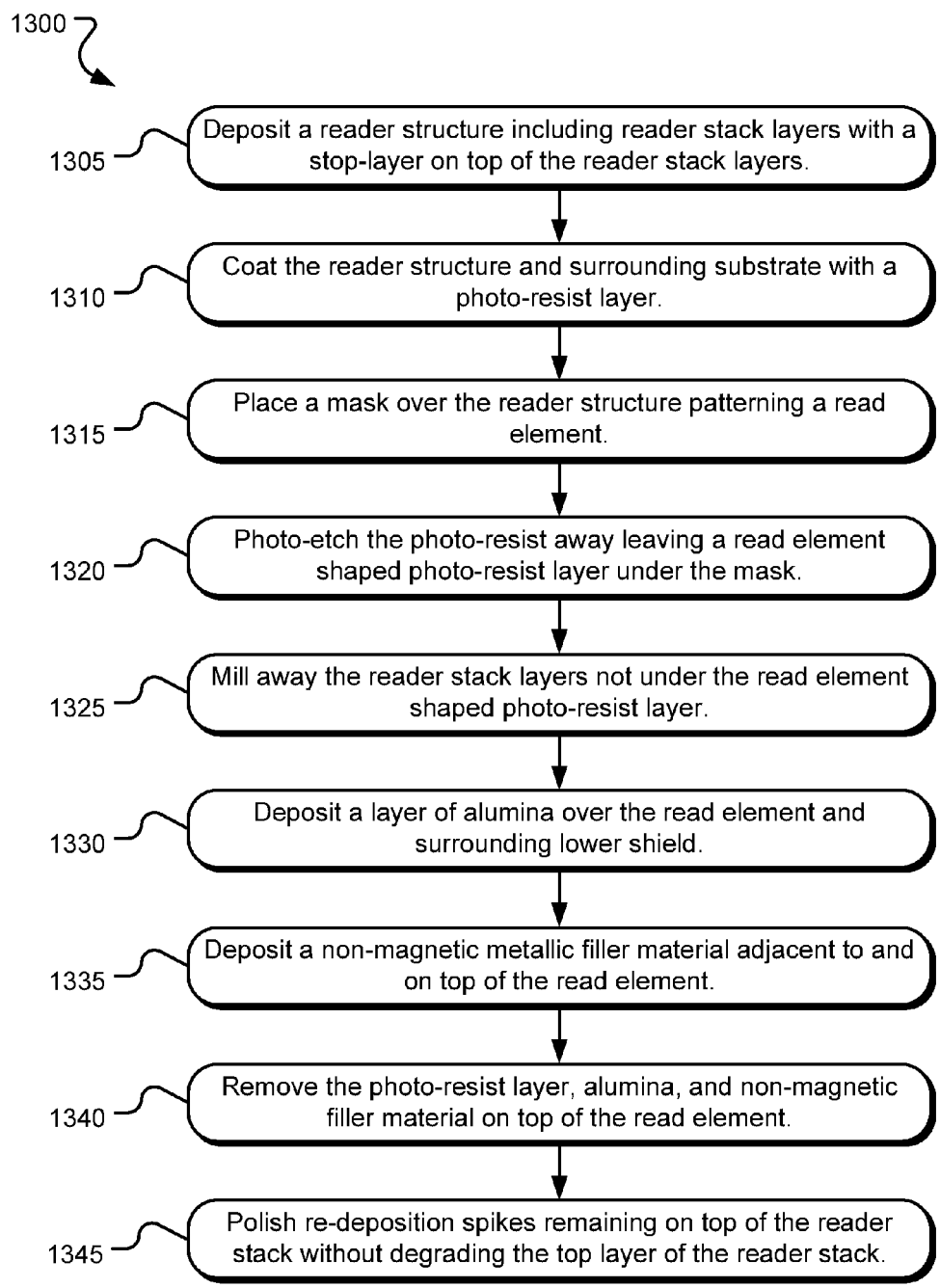
FIG. 13 illustrates example operations for depositing a read element onto a lower shield with an integrated alumina insert using one or more stop-layers.

FIG. 13 illustrates example operations 1300 for depositing a read element onto a lower shield with an integrated alumina insert using one or more stop-layers. A deposition operation 1305 deposits a reader structure including reader stack layers with a stop-layer on top of the reader stack layers. In one implementation, the read element is a tri-layer reader. The stop-layer protects the read element from recession during further manufacturing processes as discussed below. As such, one or more layers of the read element may be referred to as protected layers. The stop-layer may comprise Ruthenium or other hard non-magnetic materials.

A coating operation 1310 coats the reader structure and surrounding substrate with a photo-resist layer. A placing operation 1315 places a mask over the reader structure patterning a read element. In one implementation, the mask includes glass and chrome portions. The glass portions allow light to penetrate to the photo-resist layer. The chrome portions reflect away light and shields the photo-resist layer from the light. A photo-etching operation 1320 photo-etches the photo-resist away leaving a read element shaped photo-resist layer under the mask.

A milling operation 1325 mills away the reader stack layers that are not under the reader element shaped photo-resist layer. This forms the general shape of the read element. A second depositing operation 1330 deposits a layer of alumina over the read element and surrounding the lower shield. This layer of alumina forms the insulation layers 112 depicted in FIG. 1, for example. The alumina layer electrically isolates the lower shield and the read element from soft magnetic side shields (see non-magnetic metallic layer below).

A third depositing operation 1335 deposits a non-magnetic or soft-magnetic metallic filler material adjacent to and on top of the read element. The metallic filler material forms the side shields 110 depicted in FIG. 1. The metallic filler material isolates the tri-read element from electromagnetic interference. A removing operation 1340 removes the photo-resist layer over the read element with the alumina and metallic filler material on top of the photo-resist layer removed as well. Removing operation 1340 leaves re-deposition spikes of material on top of the read element.

Polishing operation 1345 polishes the re-deposition spikes remaining on top of the reader stack without degrading the top layer of the reader stack. The stop-layer over the reader stack prevents the polishing operation 1345 from causing recession of the reader stack. In some implementations, the stop-layer over the reader stack is etched away after polishing operation 1345.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A read sensor comprising:
    a first stop layer that protects a directly adjacent shield element from recession during at least one of chemical polishing and mechanical polishing of the read sensor, wherein the first stop layer has a thickness less than about 20 angstroms.

2. The read sensor of claim 1, further comprising: a second stop layer that protects a directly adjacent alumina layer from recession during mechanical polishing of another adjacent layer.

3. The read sensor of claim 1, wherein the first stop layer protects a directly adjacent alumina insert from recession during mechanical polishing of adjacent re-deposition material.

4. The read sensor of claim 2, wherein the first stop layer is positioned between the shield element and the second stop layer.

5. The read sensor of claim 1, wherein the first stop layer comprises Ruthenium.

6. A method of manufacturing a read sensor, comprising:
    depositing a first stop-layer directly adjacent to a shield element, wherein the first stop-layer protects the shield element from recession during at least one of chemical polishing and mechanical polishing of the read sensor, wherein the first stop layer has a thickness less than about 20 angstroms.

7. The method of claim 6, further comprising: depositing a second stop-layer that protects a directly adjacent insulating layer from recession during mechanical polishing of the read sensor.

8. The method of claim 7, wherein the insulating layer is an alumina insert.

9. The method of claim 7, wherein the first stop layer is positioned between the shield element and the second stop layer.

10. The method of claim 6, wherein the first stop-layer comprises Ruthenium.

11. The method of claim 6, further comprising:
    mechanically polishing material adjacent the shield element without causing significant recession of the first stop layer.

12. A read element comprising:
    a stop-layer that protects an adjacent layer from recession during at least one of chemical polishing and mechanical polishing of the read element, wherein the stop layer has a thickness less than about 20 angstroms.

13. The read element of claim 12, wherein the stop layer is adjacent to re-deposition material.

14. The read element of claim 12, wherein the adjacent layer protected from recession is a layer of a reader stack.

15. The read element of claim 12, wherein the adjacent layer protected from recession is an alumina insert.

16. The read element of claim 12, wherein the stop-layer protects one or more free layers and spacer layers from recession during mechanical polishing of adjacent re-deposition material.

17. The read element of claim 12, wherein the stop-layer comprises Ruthenium.

18. The read element of claim 12, wherein the stop-layer comprises at least one of tantalum and chromium.

* * * * *